United States Patent
Maattanen

(10) Patent No.: US 11,656,397 B2
(45) Date of Patent: May 23, 2023

(54) LIGHT GUIDE FOR AN ELECTRONIC DISPLAY AND ELECTRONIC DISPLAY COMPRISING SAID LIGHT GUIDE

(71) Applicant: Huawei Technologies Co., Ltd., Shenzhen (CN)

(72) Inventor: Sami Maattanen, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/284,581

(22) PCT Filed: Oct. 26, 2018

(86) PCT No.: PCT/EP2018/079410
§ 371 (c)(1),
(2) Date: Apr. 12, 2021

(87) PCT Pub. No.: WO2020/083504
PCT Pub. Date: Apr. 30, 2020

(65) Prior Publication Data
US 2021/0356645 A1 Nov. 18, 2021

(51) Int. Cl.
*F21V 8/00* (2006.01)
*G02F 1/1335* (2006.01)
*G02B 5/04* (2006.01)
*G02B 5/02* (2006.01)

(52) U.S. Cl.
CPC ......... *G02B 6/0053* (2013.01); *G02B 5/0242* (2013.01); *G02B 6/0051* (2013.01); *G02F 1/133528* (2013.01); *G02B 5/0268* (2013.01); *G02B 5/04* (2013.01); *G02F 2202/28* (2013.01)

(58) Field of Classification Search
CPC .. G02B 6/0053; G02B 5/0242; G02B 5/0268; G02B 5/04; G02B 6/0051
See application file for complete search history.

(56) References Cited

U.S. PATENT DOCUMENTS

| | | | |
|---|---|---|---|
| 11,099,314 B2* | 8/2021 | Epstein | G02B 6/0038 |
| 2004/0228106 A1 | 11/2004 | Stevenson et al. | |
| 2005/0099815 A1 | 5/2005 | Kim et al. | |
| 2005/0134963 A1 | 6/2005 | Stevenson et al. | |
| 2006/0290253 A1* | 12/2006 | Yeo | G02B 5/0231 |
| | | | 313/116 |
| 2007/0097709 A1 | 5/2007 | Hsieh | |
| 2009/0033829 A1 | 2/2009 | Chang | |
| 2009/0059119 A1 | 3/2009 | Ohta et al. | |

(Continued)

FOREIGN PATENT DOCUMENTS

| | | |
|---|---|---|
| CN | 1614471 A | 5/2005 |
| CN | 1619376 A | 5/2005 |

(Continued)

*Primary Examiner* — Jonathan Y Jung
(74) *Attorney, Agent, or Firm* — Conley Rose, P.C.

(57) ABSTRACT

An integral light guide for an electronic display includes a top surface, a bottom surface, and a body extending between the top surface and the bottom surface. The body includes a prism section and a microstructure section, the prism section is arranged adjacent to the top surface, the microstructure section is arranged adjacent to the bottom surface. The prism section includes a prism pattern enclosed within the body.

20 Claims, 1 Drawing Sheet

(56) References Cited

U.S. PATENT DOCUMENTS

| | | | |
|---|---|---|---|
| 2011/0286222 A1* | 11/2011 | Coleman | G02B 6/0065 |
| | | | 156/219 |
| 2011/0299012 A1* | 12/2011 | Wang | G02B 6/003 |
| | | | 362/552 |
| 2013/0335677 A1* | 12/2013 | You | G02F 1/133609 |
| | | | 349/65 |
| 2014/0049983 A1* | 2/2014 | Nichol | G02B 6/0018 |
| | | | 362/610 |
| 2014/0150952 A1 | 6/2014 | Sung | |
| 2014/0185319 A1* | 7/2014 | Hu | G02B 6/00 |
| | | | 362/610 |
| 2016/0085018 A1* | 3/2016 | Park | G02B 6/0083 |
| | | | 362/613 |
| 2016/0238774 A1* | 8/2016 | Koike | G02B 6/0055 |
| 2017/0075058 A1 | 3/2017 | Wu et al. | |
| 2017/0153363 A1 | 6/2017 | Lee et al. | |
| 2017/0184868 A1 | 6/2017 | Lee et al. | |
| 2018/0088270 A1* | 3/2018 | Tuohioja | G02B 26/005 |
| 2019/0064422 A1 | 2/2019 | Kim et al. | |
| 2019/0339438 A1* | 11/2019 | Epstein | G02B 6/0053 |
| 2021/0026086 A1* | 1/2021 | Rinko | G02B 6/0063 |
| 2021/0231858 A1* | 7/2021 | Wang | G02B 5/1866 |

FOREIGN PATENT DOCUMENTS

| | | |
|---|---|---|
| CN | 1959490 A | 5/2007 |
| CN | 101201416 A | 6/2008 |
| CN | 101359063 A | 2/2009 |
| CN | 102955193 A | 3/2013 |
| CN | 104121517 A | 10/2014 |
| CN | 105759506 A | 7/2016 |
| CN | 106970441 A | 7/2017 |
| CN | 108562966 A | 9/2018 |
| JP | 2012181279 | 9/2012 |
| JP | 2017111313 | 6/2017 |
| KR | 20070029897 A | 3/2007 |
| KR | 20100088457 A | 8/2010 |
| KR | 20150047651 A | 5/2015 |
| WO | 2016085661 A1 | 6/2016 |
| WO | 2018156547 A1 | 8/2018 |

* cited by examiner

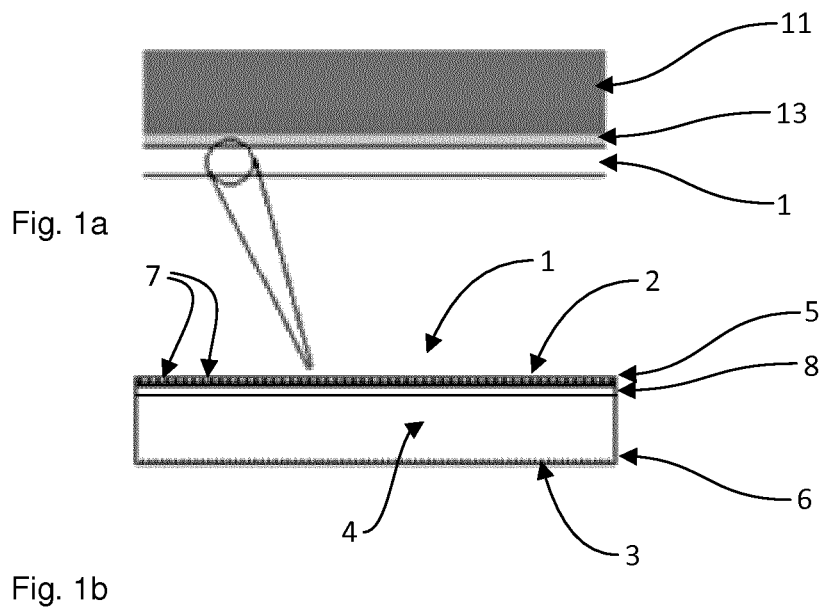
Fig. 1a
Fig. 1b
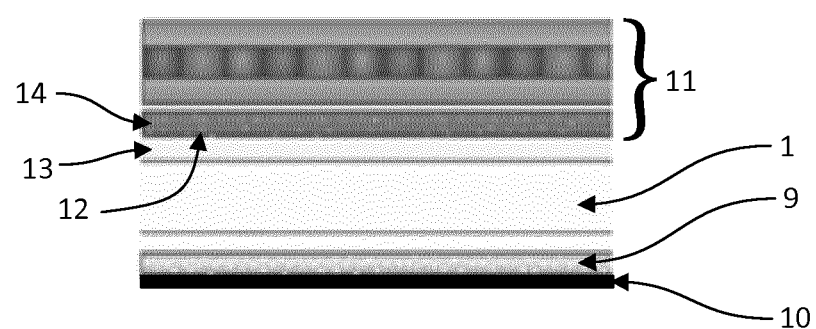
Fig. 2

LIGHT GUIDE FOR AN ELECTRONIC DISPLAY AND ELECTRONIC DISPLAY COMPRISING SAID LIGHT GUIDE

CROSS-REFERENCE TO RELATED APPLICATIONS

This application is a U.S. National Stage of International Patent Application No. PCT/EP2018/079410 filed on Oct. 26, 2018, which is hereby incorporated by reference in its entirety.

TECHNICAL FIELD

The disclosure relates to a light guide for use in an electronic display.

BACKGROUND

Non-emissive electronic displays usually comprise of a display panel and a back light unit (BLU).

Traditional non-emissive electronic displays comprise a number of layers stacked on top of each other, the display panel, e.g., comprising a liquid crystal display (LCD) panel and a polarizer layer, and the back light unit comprising several optical film layers including prism sheets, diffuser, light guide, and reflector.

The back light unit is usually attached to the display panel by means of rim tape, and, if necessary, reinforced by means of glue applied to the sides of the display panel and the back light unit, covering the gap therebetween.

The rim tape not only reduces the active area of the display panel, but also leaves a small air gap between the display panel and the back light unit. Visible foreign particles may gather in the air gap between the display panel and the back light unit. Additionally, the electronic display will be sensitive to even low levels of mechanical stress, which may cause quality issues such as white spots.

SUMMARY

It is an object to provide an improved electronic display. The foregoing and other objects are achieved by the features of the independent claims. Further implementation forms are apparent from the dependent claims, the description, and the figures.

According to a first aspect, there is provided an integral light guide for an electronic display, the integral light guide comprising a top surface, a bottom surface, and a body extending completely between the top surface and the bottom surface, the body comprising a prism section and a microstructure section, the prism section being arranged adjacent, and extending essentially in parallel with, the top surface, the microstructure section being arranged adjacent, and extending essentially in parallel with, the bottom surface, the prism section comprising at least one prism pattern completely enclosed within the body.

An integral light guide, wherein the different optical functionalities, such as the prism functionality and the light guiding functionality provided by the microstructure section, are integrated into one body instead of being executed by means of separate sheets stacked on top of each other, is less sensitive to penetration by foreign particles and mechanical impact than prior art solutions. Furthermore, assembly of the light guide, itself and together with other components such as a display panel, is simplified, since the assembly process comprises fewer components than prior art solutions. Furthermore, there is no need for placing the different components at a specific distance from each other, since it no longer will be a requirement to separate the different sheets/optical functionalities by air gaps.

In a possible implementation form of the first aspect, the prism pattern comprises cavities filled with a fluid, preferably air, providing the light guide with an integral air gap between the prism functionality and, e.g., the light guiding functionality.

In a further possible implementation form of the first aspect, the body further comprises a diffusing section arranged between the prism section and the microstructure section, allowing further functionalities to be included into the integral light guide.

In a further possible implementation form of the first aspect, the sections, i.e. the prism section, the microstructure section, and if provided, the diffusing section, extend in parallel with the top surface, the bottom surface, and each other, and the provided sections are superimposed on top of each other and in direct abutment with each other, any air gaps between sections being present only in the form of the prism pattern cavities.

In a further possible implementation form of the first aspect, the integral light guide further comprises at least one of a reflector layer and a metal bezel layer, adhered to the bottom surface, allowing further functionalities to be included into the integral light guide.

In a further possible implementation form of the first aspect, the integral light guide is one of an integral light guide plate and an integral light guide sheet, facilitating manufacture of the integral light guide by means of either injection molding or roll-to-roll processing.

According to a second aspect, there is provided an electronic display comprising a non-emissive display panel and the above-mentioned integral light guide, a top surface of the integral light guide being adhered to a bottom surface of the display panel.

An electronic display, wherein the different components and optical functionalities are integrated into one body instead of being executed by means of separate components stacked on top of each other, is less sensitive to penetration by foreign particles and mechanical impact that prior art solutions. Furthermore, assembly of the electronic display is simplified, since the assembly process comprises fewer components to be arranged at correct overlapping positions and at the correct distance from each other.

In a possible implementation form of the second aspect, the display panel comprises a liquid crystal panel, being a well-known and reliable component.

In a further possible implementation form of the second aspect, at least a part of the top surface of the integral light guide is adhered to at least a part of the bottom surface of the display panel by means of optically clear adhesive, facilitating an as large active display surface as possible on the electronic display.

In a further possible implementation form of the second aspect, the entire top surface of the integral light guide is adhered to the bottom surface of the display panel by means of optically clear adhesive, facilitating a very robust electronic display.

In a further possible implementation form of the second aspect, the display panel further comprises a polarizer layer, a surface of the polarizer layer forming the bottom surface of the display panel, allowing further functionalities to be included into the electronic display.

This and other aspects will be apparent from the embodiments described below.

BRIEF DESCRIPTION OF THE DRAWINGS

In the following detailed portion of the present disclosure, the aspects, embodiments, and implementations will be explained in more detail with reference to the example embodiments shown in the drawings, in which:

FIG. 1a shows a schematic, cross-sectional side view of an electronic display in accordance with one embodiment of the present invention;

FIG. 1b shows a more detailed cross-sectional side view of the light guide comprised in the embodiment shown in FIG. 1a;

FIG. 2 shows a further partial, cross-sectional side view of electronic device shown in FIG. 1a.

DETAILED DESCRIPTION

FIG. 1a shows an electronic display comprising a display panel 11 and an integral light guide 1 interconnected by means of a layer of adhesive 13. The display panel 11 is non-emissive, and preferably a liquid crystal panel. The adhesive 13 may be an optically clear adhesive.

A top surface 2 of the integral light guide is directly adhered to a bottom surface 12 of the display panel. At least a part of the top surface 2 of the integral light guide 1 is adhered to at least a part of the bottom surface 12 of the display panel 1, e.g. allowing use of rim tape around the periphery of the integral light guide 1 and the display panel 11. Preferably, the entire top surface 2 of the integral light guide 1 is adhered to the bottom surface 3 of the display panel 1 such that use of rim tape is neither necessary nor possible.

As shown in FIG. 2, the display panel 11 may further comprise a polarizer layer 14, in which case an outer, visible, surface of the polarizer layer 14 forms the bottom surface 12 of the display panel 11. The polarizer layer 14 extends in parallel with the main plane of the remainder of the display panel 11.

FIG. 1b shows the integral light guide 1 in more detail.

The integral light guide 1 comprises a top surface 2, a bottom surface 3, and a body 4 extending completely between the top surface 2 and the bottom surface 3. The top surface 2 is to be directed towards a display panel 11, and the bottom surface 3 is to be directed towards an interior of an electronic device such as a mobile phone, a tablet etc.

The body 4 of the integral light guide 1 extends completely between the top surface 2 and the bottom surface 3, such that the top surface 2 completely covers the full width of the upper section of the body 4 and the bottom surface 3 completely covers the entire width of the lower section of the body 4. In other words, the "width" and "depth" of the top surface 2, the bottom surface 3, and the body 4 are to be the same, while the height of the top surface 2, the bottom surface 3, and the body 4 is set independently. The "height" corresponds to the distance between the top surface 2 and the bottom surface 3, i.e. the height is measured in a direction perpendicular to the planes of the top surface 2 and the bottom surface 3. The width and depth correspond to the outer dimensions of the top surface 2, the bottom surface 3, and the body 4 in two perpendicular directions parallel to the planes of the top surface 2 and the bottom surface 3.

The body 4 comprises a prism section 5 and a microstructure section 6. The prism section 5 is arranged adjacent the top surface 2, as seen in a direction perpendicular to the plane of the top surface 2 towards the bottom surface 3. In one embodiment, the prism section 5 also includes the top surface 2.

The microstructure section 6 is arranged adjacent the bottom surface 3, as seen in a direction perpendicular to the plane of the bottom surface 3 towards the top surface 2. In one embodiment, the microstructure section 6 also includes the bottom surface 3.

The prism section 5 comprises at least one prism pattern completely enclosed within the body 4. The prism section 5 may comprise several prism patterns superimposed over each other, the plane of each individual prism pattern extending in parallel with the top surface 2 and the bottom surface 3. Each prism pattern comprises a number of cavities 7 filled with a fluid, preferably air, enabling the cavities to reflect light desired directions. The cavities 7 of each prism pattern are distributed across a plane of the prism section 5.

The prism pattern may be imprinted or embossed onto an internal surface of the prism section 5. The cavities 7, formed during the imprinting/embossing, are directed inwards into the prism section 5 such that the outer borders of the prism section 5 comprises only flat surfaces.

The body 4 of the integral light guide 1 may comprise a diffusing section 8 arranged between the prism section 5 and the microstructure section 6, i.e. within the body 4.

The prism section 5 and the microstructure section 6, as well as the diffusing section 8 when provided, extend in parallel with the top surface 2, the bottom surface 3, and each other. The prism section 5, the microstructure section 6, and the diffusing section 8 are superimposed on top of each other and arranged in direct abutment with each other. Any air gaps between the prism section 5, the microstructure section 6, and the diffusing section 8, or any other additional sections, is present only in the form of prism pattern cavities 7.

The integral light guide 1 may further comprise at least one of a reflector layer 9 and a metal bezel layer 10, adhered to the bottom surface 3. If the integral light guide 1 comprises both a reflector layer 9 and a metal bezel layer 10, then a surface of the metal bezel layer 10 forms the actual, outer bottom surface of the integral light guide 1. The reflector layer 9 is arranged between the microstructure section 6 and the metal bezel layer 10. The reflector layer 9 and the metal bezel layer 10 both extend in parallel with the top surface 2, the bottom surface 3, and each other.

All different sections of the integral light guide 1, i.e. the prism section 5, the microstructure section 6, diffusing section 8, reflector layer 9, and a metal bezel layer 10, are arranged in direct abutment with each other, i.e. there are no air gaps between the different sections or layers.

The integral light guide 1 may be an integral light guide plate or an integral light guide sheet. The integral light guide plate is manufactured by means of injection molding, and the integral light guide sheet is manufactured by means of roll-to-roll processing.

The various aspects and implementations has been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope.

The invention claimed is:

1. An integral light guide for an electronic display, wherein the integral light guide comprises:
    a top surface;
    a bottom surface; and
    a body extending between the top surface and the bottom surface and comprising:
        a prism section arranged adjacent to the top surface, wherein the prism section comprises a prism pattern enclosed by the body, and wherein the prism pattern comprises cavities directed inwards into the prism section such that an outer surface of the prism section comprises only flat surfaces;
        a microstructure section arranged adjacent to the bottom surface; and
        a diffusing section arranged between the prism section and the microstructure section,
        wherein the prism section, the microstructure section, and the diffusing section extend in parallel with the top surface, the bottom surface, and each other,
        wherein the prism section, the microstructure section, and the diffusing section are superimposed on top of each other,
        wherein the prism section and the diffusing section are in direct abutment with each other, and
        wherein the microstructure section and the diffusing section are in direct abutment with each other.

2. The integral light guide of claim 1, wherein the cavities are filled with a fluid.

3. The integral light guide of claim 1, wherein air gaps between the prism section and the microstructure section, and between the prism section and the diffusing section are present in a form of the cavities.

4. The integral light guide of claim 1, further comprising at least one of a reflector layer or a metal bezel layer that is adhered to the bottom surface.

5. The integral light guide of claim 1, wherein the integral light guide is one of an integral light guide plate or an integral light guide sheet.

6. An electronic display comprising:
    a non-emissive display panel comprising a first bottom surface; and
    an integral light guide comprising:
        a top surface adhered to the first bottom surface;
        a second bottom surface;
        a body extending between the top surface and the second bottom surface, and comprising:
            a prism section arranged adjacent to the top surface, wherein the prism section comprises a prism pattern enclosed by the body, and wherein the prism pattern comprises cavities directed inwards into the prism section such that an outer surface of the prism section comprises only flat surfaces;
        a microstructure section arranged adjacent to the second bottom surface; and
        a diffusing section arranged between the prism section and the microstructure section,
        wherein the prism section, the microstructure section, and the diffusing section extend in parallel with the top surface, the second bottom surface, and each other,
        wherein the prism section, the microstructure section, and the diffusing section are superimposed on top of each other,
        wherein the prism section and the diffusing section are in direct abutment with each other, and
        wherein the microstructure section and the diffusing section are in direct abutment with each other.

7. The electronic display of claim 6, wherein the non-emissive display panel further comprises a liquid-crystal display panel.

8. The electronic display of claim 6, wherein a part of the top surface adheres to a part of the first bottom surface using optically clear adhesive.

9. The electronic display of claim 8, wherein the top surface adheres to the first bottom surface using optically clear adhesive.

10. The electronic display of claim 6, wherein the non-emissive display panel further comprises a polarizer layer, and wherein the polarizer layer comprises a surface that forms the first bottom surface.

11. The electronic display of claim 6, wherein the cavities are filled with a fluid.

12. The electronic display of claim 6, wherein air gaps between the prism section and the microstructure section, and between the prism section and the diffusing section are in a form of the cavities.

13. The electronic display of claim 6, further comprising a reflector layer adhered to the second bottom surface.

14. The electronic display of claim 6, further comprising a metal bezel layer adhered to the second bottom surface.

15. The electronic display of claim 6, wherein the integral light guide is an integral light guide plate.

16. The electronic display of claim 6, wherein the integral light guide is an integral light guide sheet.

17. The electronic display of claim 6, further comprising:
    a metal bezel layer adhered to the second bottom surface; and
    a reflector layer arranged between the microstructure section and the metal bezel layer.

18. The electronic display of claim 17, wherein the reflector layer and the metal bezel layer extend in parallel with the top surface, the second bottom surface, and each other.

19. The integral light guide of claim 1, further comprising:
    a metal bezel layer adhered to the second bottom surface; and
    a reflector layer arranged between the microstructure section and the metal bezel layer.

20. The integral light guide of claim 19, wherein the reflector layer and the metal bezel layer extend in parallel with the top surface, the bottom surface, and each other.

* * * * *